Figure 1:
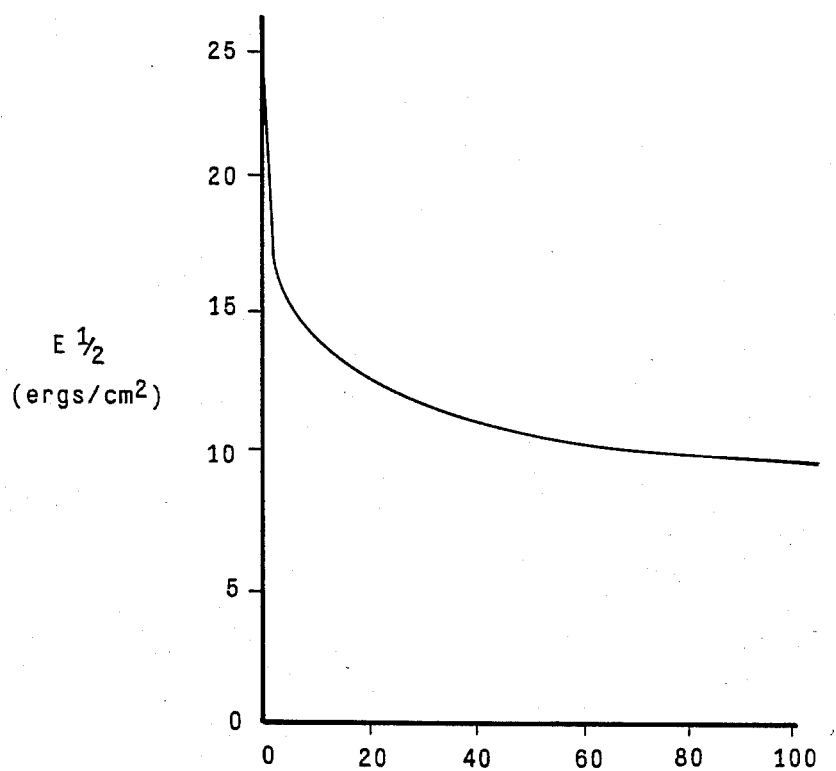

United States Patent [19]

Kazmaier et al.

[11] Patent Number: 4,559,286
[45] Date of Patent: Dec. 17, 1985

[54] MIXED SQUARAINE PHOTOCONDUCTIVE COMPOSITIONS

[75] Inventors: Peter M. Kazmaier; Giuseppa Baranyi; Cheng-Kuo Hsiao; Richard A. Burt, all of Mississauga, Canada

[73] Assignee: Xerox Corporation, Stamford, Conn.

[21] Appl. No.: 650,380

[22] Filed: Sep. 13, 1984

[51] Int. Cl.$^4$ ............................................. G03G 15/02
[52] U.S. Cl. ........................................ 430/59; 430/74
[58] Field of Search ................................... 430/59, 74

[56] References Cited

U.S. PATENT DOCUMENTS

| | | | |
|---|---|---|---|
| 3,121,006 | 2/1964 | Middleton et al. | 430/84 |
| 3,824,099 | 7/1974 | Champ et al. | 430/58 |
| 3,838,059 | 9/1974 | Wong | 252/299 |
| 4,123,270 | 10/1978 | Heil et al. | 430/58 |
| 4,251,612 | 2/1981 | Chu et al. | 430/59 |
| 4,265,990 | 5/1981 | Stolka et al. | 430/59 |
| 4,353,971 | 10/1982 | Chang et al. | 430/58 |
| 4,481,270 | 11/1984 | Kubota et al. | 430/74 X |
| 4,486,520 | 12/1984 | Yanus | 430/59 |

FOREIGN PATENT DOCUMENTS 763540  8/1972  Belgium .

OTHER PUBLICATIONS

Balanson et al., "Reduction of Fatigue in Squarylium Particulate Photoconductor by Electron Transport Doping", IBM Tech. Discl. Bull., vol. 24, No. 11B, Apr. 1982, p. 6194.

Loutfy et al., "Photoconductivity of Organic Particle Dispersions: Squaraine Dyes", Photographic Science and Engineering, vol. 27, No. 1, Jan./Feb., 1982, pp. 5–9.

Primary Examiner—Roland E. Martin
Attorney, Agent, or Firm—E. O. Palazzo

[57] ABSTRACT

An improved process for the preparation of mixed squaraine compositions which comprises reacting squaric acid, an aromatic amine, and a fluoroaniline, in the presence of an aliphatic alcohol, and an optional azeotropic substance. Also disclosed are mixed squaraine composition products of the following formulas:

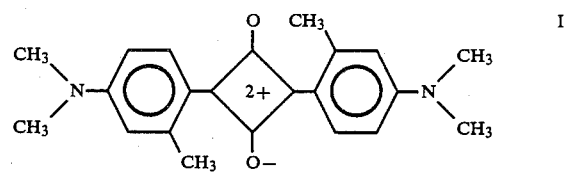

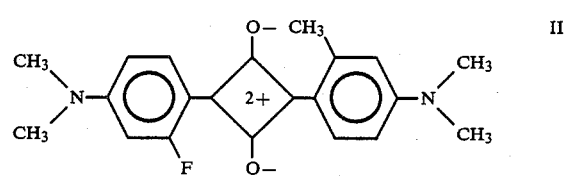

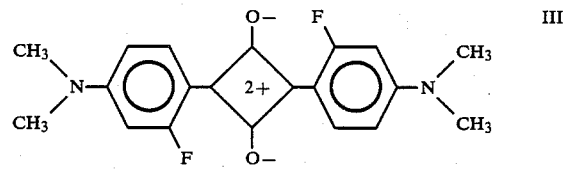

11 Claims, 2 Drawing Figures

MIXED SQUARAINE PHOTOCONDUCTIVE COMPOSITIONS

BACKGROUND OF THE INVENTION

This invention relates generally to improved processes for preparing mixed squaraine compositions of matter, and more specifically the present invention is directed to processes for obtaining mixed squaraine compositions of enhanced photosensitivity by accomplishing the reaction in the presence of fluoroaniline compositions. In one embodiment of the present invention there is provided a mixture of squaraine composition products, especially bis[4-N,N-dimethyl-2-methyl phenyl]squaraine doped with N,N-dimethyl-3-fluoroaniline squaraines, of enhanced photosensitivity by the reaction of squaric acid, and an aromatic amine in the presence of a fluoroaniline, particularly N,N-dimethyl-3-fluoroaniline. The squaraine compositions resulting from these processes are useful for incorporation into layered photoresponsive imaging members wherein, for example, the sensitivity thereof can be varied or enhanced. These members are thus responsive to visible light, and infrared illumination needed for laser printing, wherein gallium arsenide diode lasers are selected. Specific photoresponsive devices or imaging members envisioned can, for example, contain situated between a photogenerating layer, and a supporting substrate, a photoconductive composition comprised of the squaraine compositions prepared in accordance with the process of the present invention.

Photoconductive imaging members with specific squaraine compositions, particularly hydroxy squaraines, are known. Also disclosed in the prior art are photoresponsive devices with photogenerating layers and transport layers, reference U.S. Pat. No. 4,265,990. Examples of photogenerating layers disclosed in this patent include trigonal selenium, and phthalocyanines. Transport layers that may be selected are comprised of certain diamines dispersed in an inactive resinous binder composition. Moreover, the use of certain squaraine pigments in photoresponsive imaging devices is disclosed in U.S. Pat. No. 4,414,639, the disclosure of which is totally incorporated herein by reference, wherein there is described an improved photoresponsive device comprised of a substrate, a hole blocking layer, an optional adhesive interface layer, an inorganic photogenerating layer, a photoconductive composition capable of enhancing or reducing the intrinsic properties of the photogenerating layer, and a hole transport layer. As photoconductive compositions for this device, there can be selected various squaraine pigments, including hydroxy squaraine compositions. Additionally, there are disclosed in U.S. Pat. No. 3,824,099 certain photosensitive hydroxy squaraine compositions. According to the disclosure of this patent, the squaraine compositions are photosensitive in normal electrostatographic imaging systems.

In other copending applications, there is described the use of novel squaraine compositions of matter, inclusive of bis-9-(8-hydroxyjulolidinyl)squaraines as imaging members. One of the members disclosed is comprised of a supporting substrate, a hole blocking layer, an optional adhesive interface layer, an inorganic photogenerating layer, a photoconducting composition layer capable of enhancing or reducing the intrinsic properties of the photogenerating layer, and comprised of the novel julolidinyl squaraine materials disclosed in the copending application, and a hole transport layer.

Also disclosed in U.S. Pat. No. 3,617,170 are optically sensitized photoconductive layers which preferably contain zinc oxide as a photoconductor, the sensitivity of which remains unchanged as a result of storage, in view of the presence of 1,3 or 1,2-squaric acid methine dyes of the formula as illustrated in column 1, beginning at line 35; while U.S. Pat. No. 3,824,099, discloses sensitive xerographic devices with a charge generating layer comprised of a squaric acid methine dye, and a charge transport layer of a triarylpyrazoline compound.

Processes for preparing squaraine compositions generally involve the reaction of squaric acid with an aromatic amine. Thus, for example, the novel julolidinyl squaraine compositions disclosed in the referenced copending application are prepared by the reaction at a temperature of from about 50 degrees Centigrade to about 130 degrees Centigrade of an aromatic amine and squaric acid, in a molar ratio of from about 1.5:1 to 3:1, in the presence of a mixture of an aliphatic alcohol and an optional azeotropic cosolvent. About 200 milliliters of alcohol per 0.1 mole of squaric acid are used, while from about 40 milliliters to about 4,000 milliliters of azeotropic material are selected. Illustrative examples of amine reactants include 8-hydroxyjulolidine, while examples of aliphatic alcohols selected are 1-butanol. Azeotropic materials used include aromatic compositions inclusive of benzene and toluene.

There is also disclosed in copending application U.S. Ser. No. 570,563, entitled Processes for the Preparation of Squaraine Compositions, the disclosure of which is totally incorporated herein by reference, a process for the preparation of photoconductive squaraine compositions wherein the known squaric acid reaction is accomplished in the presence of a phenol or a phenol squaraine. As disclosed in the referenced copending application, there is provided an improved process for the preparation of squaraine compositions which comprises reacting at an effective temperature and in the presence of an aliphatic alcohol and an optional azeotropic compound squaric acid, an aromatic amine, and a compound selected from the group consisting of phenols, or phenol squaraines. Moreover, there is disclosed in copending application U.S. Ser. No. 557,795, entitled Novel Squaraine Systems, the disclosure of which is totally incorporated herein by reference, a process for synthesizing novel unsymmetrical squaraine compositions wherein there is formed a mixture of squaric acid, a primary alcohol, a first tertiary amine, and a second tertiary amine.

Additionally, there is disclosed in another copending application U.S. Ser. No. 557,796, entitled Process for Squaraine Compositions, the disclosure of which is totally incorporated herein by reference, a squaraine process wherein there is reacted a dialkyl squarate and a N,N-dialkylaniline in the presence of an acid catalyst, at a temperature of from about 80° Centigrade to about 160° Centigrade, in the presence of aliphatic solvents, such as methanol, ethanol, propanol, butanol and the like.

While the above processes for preparing squaraine compositions are suitable for their intended purposes, there continues to be a need for other processes wherein photoconductive squaraine compositions can be prepared. Additionally, there remains a need for simple, economical processes for preparing squaraine compositions wherein the products obtained contain dopants therein. Although it is not desired to be limited by theory, it is believed that the presence of dopants in the squaraine compositions resulting from the process of the present invention causes the photosensitivity to increase. Furthermore, there continues to be a need for the preparation of squaraine compositions of enhanced photosensitivty when these compositions are selected for layered photoresponsive imaging devices. Moreover, there is a need for processes for effecting preparation of certain squaraine compositions of enhanced photosensitivity, wherein the resulting products when incorporated into imaging members exhibit excellent dark decay and high charge acceptance values. Additionally, there continues to be a need for the preparation of mixed squaraine compositions, particularly certain bis-phenyl squaraines doped with specific N,N-dialkyl fluoroaniline squaraines, which compositions are not only photoactive but are free of mutagenic activity. Additionally, there continues to be a need for novel squaraine compositions with increased blue wavelength response and better cycling characteristics.

SUMMARY OF THE INVENTION

It is therefore an object of the present invention to provide improved processes for preparing squaraine compositions.

In another object of the present invention there are provided improved processes for preparing certain squaraine compositions, with enhanced photosensitivity, excellent dark decay properties, and acceptable charge acceptance.

In yet another object of the present invention there are provided simple, economical processes for preparing squaraine compositions of enhanced photosensitivity.

In yet another object of the present invention there are provided processes for the preparation of mixed squaraine compositions of excellent photosensitivity, and wherein these compositions are free of mutagenic activity.

In still another object of the present invention there are provided processes for the preparation of specific bis-phenyl squaraine compositions doped with cetain N,N-dialkyl fluoroaniline squaraines, which compositions are of excellent photosensitivity, low dark decay, and free of mutagenic activity.

In yet another additional object of the present invention there are provided processes for the preparation of bis(dialkyl phenyl)squaraines, doped with N,N-dialkyl 3-fluoroaniline squaraines, which compositions when incorporated into photoconductive members are sensitive to the visible and infrared region of the spectrum, and provide desirable blue light response and enhanced cycling characteristics.

In yet another object of the present invention there are provided readily scaleable processes for preparing mixed squaraine compositions.

In a further object of the present invention there are provided electrostatic imaging members having incorporated therein as the photoconductive layer the squaraine compositions prepared in accordance with the processes of the present invention. Additionally, there are provided methods of imaging with these members.

These and other objects of the present invention are generally accomplished by providing a process for the preparation of photoconductive squaraine composition mixtures wherein the known squaric acid reaction is accomplished in the presence of a fluoroaniline. More specifically, in one embodiment there is provided in accordance with the present invention an improved process for the preparation of mixed squaraine compositions which comprises reacting at an effective temperature squaric acid, an aromatic amine, and a fluoroaniline, in the presence of an aliphatic alcohol and an optional azeotropic compound. In one specific process embodiment there is provided squaraine composition mixtures, particularly bis(4-N,N-dimethyl-2-methyl phenyl)squaraine doped with N,N dialkyl 3-fluoroaniline squaraines, by reacting N,N-dimethyl-meta-toluidine, with squaric acid, in the presence of N,N-dialkyl-3-fluoroaniline, particularly N,N-dimethyl-3-fluoroaniline. Alternatively, the mixed squaraine compositions of the present invention can be prepared by reacting a mixture of N,N-dimethyl-meta-toluidine, and N,N-dimethyl-3-fluoroaniline, with squaric acid. The products resulting from these two reactions possess substantially similar properties, including equivalent electrical characteristics as illustrated hereinafter.

The processes of the present invention will now be illustrated with reference to the following two reaction schemes wherein there is selected about two parts of the aniline reactant, one part of squaric acid, and n parts of the fluoroaniline, wherein n represents a number of less than or equal to two, while in Reaction B there is selected X moles of the aniline reactant and Y moles of the fluoroaniline, wherein the ratio of X/Y is from about 10 to about 0.333, and preferably from about 3 to about 0.666.

A. Scheme I

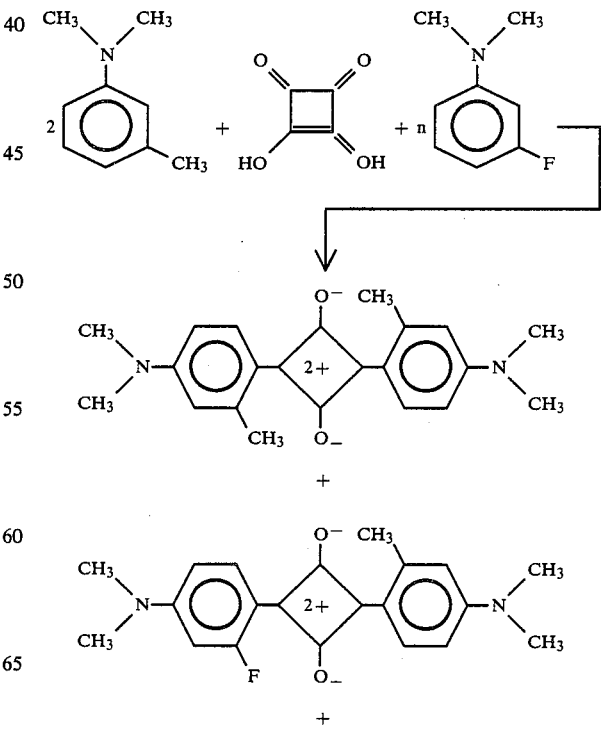

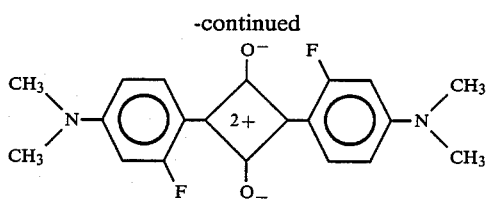

wherein n is a number of from zero (0) to about 2 (100 percent).

B. Scheme II

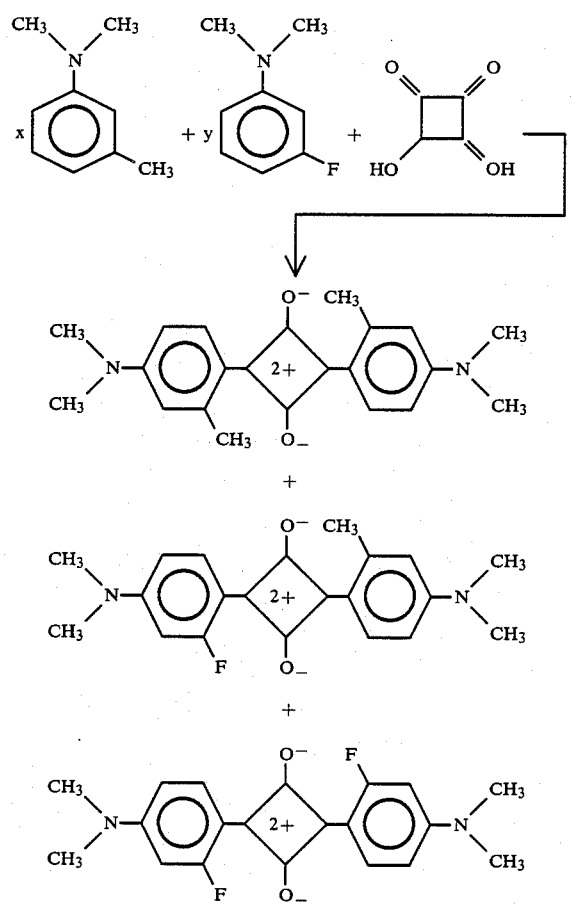

wherein x+y are as defined herein.

In one specific reaction sequence as illustrated herein with reference, for example, to the reaction scheme equations, the desired squaraine compositions are prepared by suspending squaric acid in an aliphatic alcohol and an optional azeotropic substance followed by heating. Thereafter, there is added to the resulting mixture an aromatic amine, and a fluoroaniline, or fluorobenzene of the formula illustrated herein, with continued heating until the desired product results.

In one specific illustrative embodiment, the squaraine composition mixtures of the present invention are prepared by the reaction of squaric acid and an aromatic amine, in a molar ratio of from about 1:0.4 to about 1:2.5, and preferably in a ratio of from about 1 to 2, in the presence of a mixture of an aliphatic alcohol, and the fluorobenzene illustrated. About 200 milliliters of alcohol per 0.1 moles of squaric acid are used, however, up to 2,000 milliliters of alcohol per 0.1 moles of squaric acid can be selected. Also, from about 0.01 moles to about 0.2 moles of fluorobenzene are present in the rection mixture. The reaction is generally accomplished at a temperature of from about 50° C. to about 130° C., and preferably at a temperature of about 100° C. to about 110° C. with stirring until the reaction is completed. Subsequently, the desired product is isolated from the reaction mixture by known techniques inclusive of filtration, and identified by analytical tools, including NMR, and elemental analysis for fluorine, and X-ray powder diffraction.

Examples of amine reactants include N,N-dimethyl-meta-toluidine, N,N-dipropyl-m-toluidine, N,N-dibutyl-m-toluidine, N,N-dipentyl-m-toluidine, and the like, with N,N-dimethyl-meta-toluidine being preferred. Other similar and/or equivalent amine reactants can be selected providing the objectives of the present invention are achieved. These reactants are known and can be prepared by the methods as described in the literature, reference for example the *Journal of American Chemical Society*, Vol. 68, pages 895 to 896, 1946, the disclosure of which is totally incorporated herein by reference.

For the reaction sequence of the present invention, there is selected as the fluoroaniline dopant, fluorobenzenes of the formula

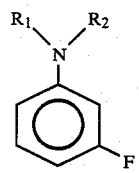

wherein $R_1$ and $R_2$ are independently selected from alkyl groups including those of from 1 to about 24 carbon atoms, such methyl, ethyl, propyl, butyl, hexyl, octyl, decyl, pentadecyl, and the like, with methyl, ethyl, propyl and butyl being preferred. It is important to the invention of this application that the fluorine atom be situated on the 3 or meta position of the fluorobenzene reactant. Illustrative examples of fluoroaniline reactants or dopants that can be selected for the processes of the present invention include N,N-dimethyl-3-fluoroaniline, N,N-diethyl-3-fluoroaniline, N,N-dipropyl-3-fluoroaniline, N,N-dibutyl-3-fluoroaniline, N,N-dihexyl-3-fluoroaniline, and the like, with N,N-dimethyl-3-fluoroaniline being preferred. These dopants are generally prepared as described in the literature, reference for example the *Journal of American Chemical Society*, Vol. 68, pages 859 to 860, 1946, the disclosure of which is totally incorporated herein by reference.

Illustrative examples of aliphatic alcohols selected for the preparation of the mixed squaraines of the present invention include 1-hexanol, and 1-octanol, neopentanol, 1-heptanol, and the like, with 1-heptanol being preferred.

There results in accordance with the process of the present invention specific novel squaraine composition mixtures, as illustrated herein with reference, for example, to reaction Schemes I and II. More specifically, thus for example, there results the product bis(4-N,N-dimethyl-2-methylphenyl)squaraine, doped with N,N-dimethyl-3-fluorophenyl squaraines, and the like.

The product compositions were characterized by fluorine combustion analysis, proton magnetic resonance and X-ray powder diffraction, specifically for example, the proton NMR spectrum indicated that a preferred product consisted of a mixture of the following three components in the proportions of from I 98.50 to II 1.43 to III 0.07 to I 41.36 to II 52.20 to III 6.44. The preferred proportions are I 74.67 to II 22.71 to III 2.62.

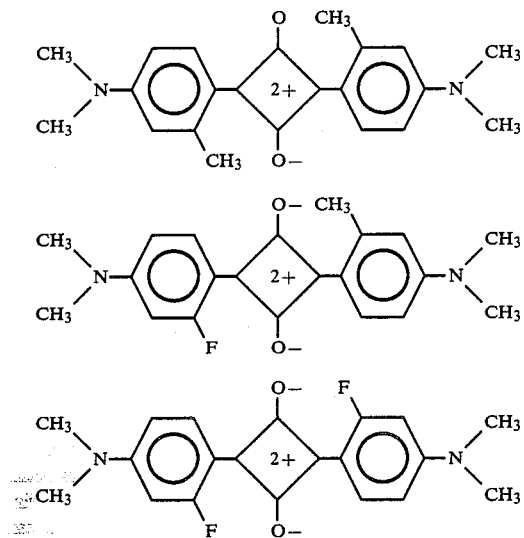

The NMR data was confirmed by fluorine combustion analysis. Also, X-ray powder diffraction indicated that the crystal structure of the novel composition was very similar to pure I, indicating that II and III are incorporated into the crystal lattice by isomorphic substitution.

In one of the preferred embodiments of the present invention as represented, for example by Scheme I, N,N-dimethyl-m-toluidine and squaric acid are reacted in the molar ratio of 2:1 in the presence of N,N-dimethyl-3-fluoroaniline, and a solvent system consisting of an aliphatic alcohol including 1-hexanol, 1-heptanol, 1-octanol or 2-ethylhexanol. The additive N,N-dimethyl-3-fluoroaniline is present in a mole percent ratio of from 2 mole percent to 100 mole percent, which mole percent is calculated from the ratio:moles of N,N-dimethyl-3-fluoroaniline divided by the moles of N,N-dimethyl-m-toluidine, multiplied by 100 percent. The preferred mole percentage additive for the N,N-dimethyl-3-fluoroaniline is 66 percent, while the preferred solvent is 1-heptanol. Moreover, in this Reaction Scheme, the reflux temperature is preferably maintained at from about 70° C. to about 115° C., although this temperature can be suitably adjusted depending on the reaction solvent selected, or by adjusting the pressure of the reaction, however, a reflux temperature of from about 100° C. to about 107° C. is preferred. Also, the reaction times can vary significantly. Generally, however, the reaction was continued for a period of from about two hours to about 40 hours, and preferably for a period of from about five hours to about seven hours, however, other reaction times are of course suitable providing the objectives of the present invention are affected. With respect to reaction Scheme II, X moles of N,N-dimethyl-m-toluidine and Y moles of N,N-dimethyl-3-fluoroaniline are reacted with m moles of squaric acid in a suitable solvent system consisting of an aliphatic alcohol, including 1-hexanol, 1-heptanol, 1-octanol or 2-ethylhexanol. The ratio of (X+Y)/m can be from about 0.8 to about 4, however, 2 is preferred. Moreover, the ratio X/Y can be from about 10 to about 0.333, and preferably from about 3 to about 0.666. In this reaction scheme, the reflux temperature generally varies from about 70° C. to about 115° C. and preferably from about 100° C. to about 107° C. The reaction times for this specific reaction are as described with reference to reaction Scheme I.

The squaraine compositions prepared in accordance with the process of the present invention, are useful as photoconductive substances sensitive in the infrared and/or visible range of the spectrum. Thus there can be prepared a layered photoresponsive device comprised of a supporting substrate, a hole transport layer, and situated therebetween a photoconductive layer, comprised of the squaraine compositions prepared in accordance with the process of the present invention. In another embodiment, the photoresponsive device envisioned is comprised of a substrate, a photoconducting layer, comprised of the squaraine compositions prepared in accordance with the process of the present invention, and situated between the photoconducting squaraine layer, and the supporting substrate, a hole transport layer. Additionally, there can be prepared photoresponsive imaging members useful in printing systems wherein the imaging member is comprised of a layer of the squaraine photoconductive composition prepared in accordance with the process of the present invention, situated between a photogenerating layer, and a hole transport layer, or wherein the photoconductive squaraine composition layer is situated between a photogenerating layer, and the supporting substrate of such a device. These members are described in a copending application U.S. Ser. No. 493,114, entitled Photoconductive Devices Containing Novel Squaraine Compositions, the disclosure of which is totally incorporated herein by reference.

One specific improved photosensitive device containing therein the squaraines prepared in accordance with the process of the present invention is comprised in the order stated of (1) a supporting substrate, (2) a hole blocking layer, (3) an optional adhesive interface layer, (4) an inorganic photogenerator layer, (5) a photoconductive composition layer capable of enhancing or reducing the intrinsic properties of the photogenerating layer, which composition is comprised of the squaraine materials prepared in accordance with the process of the present invention, and (6) a hole transport layer.

The photoresponsive devices or imaging members described can be prepared by any suitable well known method, the process parameters and the order of coating of the layers being dependent on the device desired. Thus, for example, a three layered photoresponsive device can be prepared by the deposition of the photoconducting layer on a supporting substrate and subsequently depositing a charge transport layer. In another process variant, the layered photoresponsive device can be prepared by providing a conductive substrate having a blocking layer and an optional adhesive layer, and thereafter applying thereto a photoconducting layer. The photoconducting layer comprising the novel squaraines of the present invention as well as the transport layer can be formed by solvent coating processes, laminating processes, or other suitable processes.

The improved photoresponsive devices of the present invention can be incorporated into various imaging systems, inclusive of conventional xerographic imaging, copying and printing systems. Additionally the improved photoresponsive devices of the present invention containing an inorganic photogenerating layer and photoconductive layer comprising the squaraines of the present invention can function simultaneously in imaging and printing systems with visible light and/or infrared light. In this embodiment, the improved photoresponsive devices of the present invention may be negatively charged, exposed to light in a wavelength of from about 400 to about 1,000 nanometers, either sequentially or simultaneously, followed by developing the resulting image and transferring the image to paper. Exposure to illumination and erasure of the layered photoresponsive devices of the present invention may be affected from either side of the devices or combinations thereof depending on the degree of transparency of any intervening layers between the source of activating radiation and the photoconductive layer.

The charge transport layer may be positioned between the supporting substrate and the photoconductive layer. More specifically, the photoresponsive device may comprise a supporting substrate, a hole transport layer comprising a hole transport composition dispersed in an inert resinous binder composition, and a photoconductive layer, comprising the novel squaraine compositions of the present invention alone or optionally dispersed in a resinous binder composition.

Alternatively, the improved photoresponsive device of the present invention may comprise a substrate, a hole blocking metal oxide layer, an optional adhesive layer, a charge carrier inorganic photogenerating layer, an organic photoconductive composition layer comprising the novel squaraine compositions. Thus, for example, the inorganic photogenerating layer may comprise an inorganic photogenerating composition dispersed in an inactive resin binder. Also, the photoconductive layer may be positioned between the inorganic photogenerating layer and the substrate, and more specifically, the photoconductive layer in this embodiment may be located between the optional adhesive layer and the inorganic photogenerating layer.

One preferred photoresponsive device of the present invention comprises a substrate of a Mylar web having a thickness of about 3 mils, coated with a layer of 20 percent light transmissive aluminum having a thickness of about 100 Angstroms, a metal oxide layer comprising aluminum oxide having a thickness of about 20 Angstroms, a polyester adhesive layer (available from E. I. duPont de Nemours & Company as 49,000 Polyester) of a thickness of about 0.05 micron, a photogenerating layer having a thickness of about 1 micron and comprising about 30 percent by weight of the mixed squaraines disclosed herein dispersed in about 70 percent by weight of resinous binder, and a hole transport layer having a thickness of about 15 microns and comprising about 35 weight percent of N,N'-diphenyl-N,N'-bis(3-methylphenyl)-[1,1'-biphenyl]-4,4'-diamine, dispersed in a polycarbonate resinous binder.

In a further specific embodiment the photoresponsive device of the present invention comprises a substrate of a Mylar web having a thickness of about 3 mils coated with about a 100 Angstrom layer of 20 percent light transmissive aluminum, a metal oxide hole blocking layer of aluminum oxide of a thickness of about 20 angstroms, an optional adhesive layer (available from E. I. duPont de Nemours & Company as 49,000 Polyester) of a thickness of about 0.05 micron, a photogenerating layer comprising about 33 volume percent of trigonal selenium dispersed in a phenoxy resinous binder (available from Allied Chemical Corporation as the poly(hydroxyether) Bakelite), and having a thickness of about 0.4 micron, a photoconductive layer about 30 percent by volume of the reaction product of squaric acid, N,N-dimethylaniline and N,N-dimethyl-m-toluidine, reference the mixed squaraines disclosed herein dispersed in about 70 percent by volume of the resinous binder (Formvar ®, available from Monsanto Company) having a thickness of about 0.5 micron, and a hole transport layer having a thickness of about 25 microns comprising about 50 percent by weight of N,N'-diphenyl-N,N'-bis(3-methylphenyl)-[1,1'-diphenyl]-4,4'-diamine, dispersed in about 50 percent by weight of a polycarbonate resinous binder.

The substrate layers may be opaque or substantially transparent and may comprise any suitable material having the requisite mechanical properties. Thus, the substrate may comprise a layer of insulating material such as an inorganic or organic polymeric material, like Mylar, a commercially available polymer; a layer of an organic or inorganic material of a semiconductive surface layer such as indium tin oxide, or aluminum, or a conductive material such as, for example, aluminum, chromium, nickel, brass or the like. The substrate may be flexible or rigid and have any suitable configuration, including for example, a plate, a cylindrical drum, a scroll, an endless flexible belt and the like. If desired, the rear surface of the substrate may be coated with an anti-curl layer, such as for example, resin materials.

The thickness of the substrate layer is not particularly critical. Depending on such factors as economical considerations, this layer may be of substantial thickness, for example, over 100 mils or even may be eliminated if the remainder of the photoresponsive device is self-supporting. A belt thickness of from about 25 mils to about 100 mils is satisfactory for high speed machines.

The hole blocking layers may comprise any suitable known materials such as metal oxides including aluminum oxide and indium tin oxide; resins such as polyvinyl butyral; polymeric organo silanes derived from silicon compounds such as hydrolyzed 3-aminopropyltriethoxy silane; organo metallic compounds such as metal acetyl acetonates; and the like. The primary purpose of this layer is to provide charge blocking, that is to prevent charge injection from the substrate during and after charging. Typically, this layer has a thickness of less than about 50 Angstroms.

Any suitable adhesive layer may be employed. Typical adhesive materials include polymers such as polyesters, polyvinyl butyral, polyvinyl pyrrolidone and the like. Typically, this layer has a thickness of less than about 0.3 micron. The inorganic photogenerating layer may comprise any suitable photoconductive charge carrier generating material sensitive to visible light. Typical inorganic photogenerating materials include amorphous selenium, amorphous selenium alloys, halogen-doped amorphous selenium, halogen-doped amorphous selenium alloys, trigonal selenium, cadmium sulfide, cadmium selenide, cadmium telluride, cadmium sulfur selenide, cadmium sulfur telluride, cadmium seleno telluride, copper and chlorine-doped cadmium sulfide, cadmium selenide and cadmium sulfur selenide and the like. Typical alloys of selenium include selenium tellurium alloys, selenium arsenic alloys, selenium tellurium arsenic alloys, and such alloys additionally containing a halogen material such as chlorine in an amount of from about 50 to about 200 parts per million.

The inorganic photogenerating layer typically has a thickness of from about 0.05 microns to about 10 microns or more, and preferably from about 0.4 microns to about 3 microns. However, the thickness of this layer is primarily dependent on the volume loading of the photogenerating material, which may vary from about 5 to about 100 volume percent. Generally, it is desirable to provide this layer in a thickness which is sufficient to absorb about 90 percent or more of the incident radiation which is directed upon it in the imagewise or printing exposure step. The maximum thickness of this layer is dependent primarily upon physical factors such as mechanical considerations, that is whether a flexible photoresponsive device is desired.

A very important layer of the photoresponsive device of the present invention is the photoconductive layer comprising the squaraine compositions disclosed herein. These compositions are generally electronically compatible with the charge carrier transport layer, enabling photoexcited charge carriers to be injected into the transport layer, and further allowing charge carriers to travel in both directions across the interface between the photoconductive layer and the charge transport layer.

Generally, the thickness of the photoconductive layer depends on a number of factors, including the thicknesses of the other layers and the amount of photoconductive material present. Accordingly, this layer can range in thickness of from about 0.05 microns to about 10 microns when the photoconductive squaraine composition of this invention is present in an amount of from about 5 percent to about 100 percent by weight. More preferably, this layer is of a thickness of between about 0.25 microns to about 1 micron when the photoconductive squaraine composition is present in an amount of about 30 percent by weight. The maximum thickness of this layer is dependent primarily upon physical factors such as mechanical considerations, that is whether a flexible photoresponsive device is desired.

The inorganic photogenerating materials or the photoconductive materials can comprise 100 percent of the respective layers or these materials can be dispersed in various suitable inorganic or resinous polymer binder materials in amounts of from about 5 percent by volume to about 95 percent by volume. Illustrative examples of polymeric binder resins that can be selected include those disclosed, for example, in U.S. Pat. No. 3,121,006, the disclosure of which is incorporated herein by reference in its entirety. Typical polymeric binder resin materials include polyesters, polyvinyl butyral, polycarbonate resins, polyvinyl carbazole, epoxy resins, poly(-hydroxyether)resins, and the like.

The charge carrier transport layers may comprise any suitable material which is capable of efficiently transporting charge carriers. This layer generally has a thickness in the range of from about 5 microns to about 50 microns. A thickness of about 20 micrometers is preferred because such layer thickness is more efficient and wear resistant than thinner layers having lower mobility carrier transport molecules. In a particularly preferred embodiment, the transport layer comprises diamine molecules of the formula:

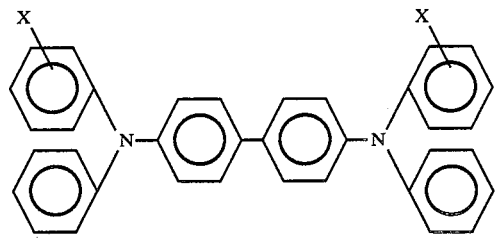

dispersed in a highly insulating and transparent organic resinous binder wherein X is selected from the group consisting of alkyl, and halogen, inclusive of (ortho) $CH_3$, (meta) $CH_3$, (para) $CH_3$, (ortho) Cl, (meta) Cl, (para) Cl. The highly insulating resin, which has a resistivity of at least about $10^{12}$ ohm-cm to prevent undue dark decay, is a material which is not necessarily capable of supporting the injection of holes from the photogenerating layer and is not capable alone of allowing the transport of these holes through the material. However, the resin becomes electrically active when it contains from about 10 to 75 weight percent of the substituted diamines corresponding to the foregoing formula.

Compounds corresponding to the above formula include, for example, N,N'-diphenyl-N,N'-bis(alkylphenyl)-[1,1-biphenyl]-4,4'-diamine wherein the alkyl is selected from the group consisting of methyl such as 2-methyl, 3-methyl and 4-methyl, ethyl, propyl, butyl, hexyl and the like. With chloro substitution, the compound is N,N'-diphenyl-N,N'-bis(chlorophenyl)-[1,1'-biphenyl]-4,4'-diamine wherein the chlorine atom is 2-chloro, 3-chloro or 4-chloro.

Other electrically active small molecules which can be dispersed in the electrically inactive resin to form a layer which will transport holes include, for example, bis(4-diethylamine-2-methylphenyl)phenylmethane; 4',4''-bis(diethylamino)-2',2''-dimethyltriphenyl methane; bis-4-(diethylamino phenyl)phenylmethane; and 4,4'-bis(diethylamino)-2,2'-dimethyl triphenylmethane. Providing that the objectives of the present invention are achieved, other suitable charge carrier transport molecules can be employed in the transport layer.

Examples of the highly insulating and transparent resinous material or inactive binder resinous material, for the transport layers include materials as described in U.S. Pat. No. 3,121,006, the disclosure of which is incorporated herein by reference in its entirety. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight (Mw) of from about 20,000 to about 100,000 with a molecular weight in the range of from about 50,000 to about 100,000 being particularly preferred. Generally, the resinous binder is comprised of from about 10 to about 75 percent by weight of the active transport material and more preferably from about 35 percent to about 50 percent based on the total weight of the transport layer.

Also included within the scope of the present invention are methods of imaging with the photoresponsive devices comprised of the mixed squaraines disclosed. These methods of imaging generally involve the formation of an electrostatic latent image on the imaging member, development of the image with a toner composition, and transfer of the image to a suitable receiving member, followed by permanently affixing the image thereto. The electrostatic latent image may be formed by any suitable technique, such as by uniform electrostatic charging, followed by exposure to activating radiation. Exposure to activating radiation may be effected by means of a conventional light/lens system using a broad spectrum white light source or by other means such as a laser or image bar. In the later two embodiments, the photoresponsive device is sensitive to infrared illumination.

The invention will now be described in detail with reference to specific preferred embodiments thereof, it being understood that these examples are intended to be illustrative only. The invention is not intended to be limited to the material, conditions, or process parameters recited herein. All parts and percentages are by weight unless otherwise indicated.

EXAMPLES I–VII

There were prepared a number of mixed squaraine compositions with the mole percent of fluorine additives as illustrated in Table 1 in the following manner:

A 1 liter four-necked round-bottomed flask equipped with a Dean-Stark trap, reflux condenser, pressure equalizing addition funnel, argon bleed tube and magnetic stir bar was charged with squaric acid (11.4 grams, 0.1 mole) and 1-heptanol (400 milliliters). The addition funnel was charged with N,N-dimethyl-m-toluidine (0.2 mole) and N,N-dimethyl-3-flluoroaniline additive (n moles). The system was sealed and evacuated by mechanical pump to 40 Torr. When the pressure inside the reactor had reached equilibrium, the reactor was heated with a heating mantle to reflux (103° C.), for about 10 minutes. After exactly 15 minutes of reflux, the amine was added in one portion. The solution transferred from clear to green within 5 minutes of the addition of the amine. Refluxing was continued for 5.5 hours, when approximately 3 milliters of water had collected in the Dean-Stark trap, at which time the reaction was terminated. The resulting product crystals were collected on a 10 mm Millipore ® filter and slurried twice with 2×250 milliliters of ethyl acetate. The yields and characterization data are presented in Table 1.

TABLE 1

| Example No. | % Yield | n | Mole % Additive | % F in* Product |
|---|---|---|---|---|
| I | 53% | 0 | 0 | 0 |
| II | 57% | 0.01 | 5 | 0.084 |
| III | 60% | 0.02 | 10 | 0.19 |
| IV | 58% | 0.05 | 25 | 0.39 |
| V | 58% | 0.1 | 50 | 0.68 |
| VI | 62% | 0.132 | 66 | 1.19 |
| VII | 59% | 0.2 | 100 | 1.26 |

*Percent, %, fluorine as determined by combustion analysis.

Further, the percentages of compounds I, II, and III present were as follows:

| Example No. | % of I | % of II | % of III |
|---|---|---|---|
| I | 100 | 0 | 0 |
| II | 98.5 | 1.43 | 0.07 |
| III | 96.1 | 3.5 | 0.40 |
| IV | 92.3 | 6.9 | 0.80 |
| V | 87.1 | 11.5 | 1.4 |
| VI | 79.2 | 18.6 | 2.2 |
| VII | 78.2 | 19.4 | 2.4 |

EXAMPLES VIII–XVIII

There was prepared a number of mixed squaraine composition products, in accordance with reaction scheme II, by varying the ratio of reactants as illustrated in Table 2 as follows. These preparations were accomplished in the following manner:

A 1 liter four-necked round-bottomed flask equipped with a Dean-Stark trap, reflux condenser, pressure equalizing addition funnel, argon bleed tube and magnetic stir bar was charged with squaric acid (11.4 grams, 0.1 mole) and 1-heptanol (400 milliliters). The addition funnel was charged with N,N-dimethyl-m-toluidine (x moles) and N,N-dimethyl-3-fluoroaniline (y moles). The system was sealed and evacuated by mechanical pump to 40 Torr. When the pressure inside the reactor had reached equilibrium, the reactor was heated with a heating mantle to reflux (103° C.), for approximately 10 minutes. After 15 minutes of reflux, the amines were added in one portion. The solution was transformed from clear to green within 5 minutes of the addition of the amines. Refluxing was continued for 5.5 hours at which time approximately 3 milliliters of water had collected in the Dean-Stark trap. The reaction was terminated and the product crystals were collected on a 10 micron Millipore ® filter followed by slurrying twice with 2×250 milliliters of ethyl acetate. The yields and characterization data are presented in Table 2. The X-ray powder pattern of these samples were all identical with the X-ray powder pattern of bis(4-dimethylamino-2-methylphenyl)squaraine even when the percentage of fluorine was 5.13.

TABLE 2

| Example | % Yield | x | y | Ratio | % F* In Product |
|---|---|---|---|---|---|
| VIII | 36 | 0.00 | 0.20 | 0/100 | 10.48 |
| IX | 33 | 0.050 | 0.15 | 25/75 | 5.13 |
| X | 46 | 0.080 | 0.12 | 40/60 | 3.20 |
| XI | 44 | 0.10 | 0.10 | 50/50 | 1.77 |
| XII | 45 | 0.11 | 0.090 | 55/45 | 1.46 |
| XIII | 46 | 0.12 | 0.080 | 60/40 | 1.20 |
| XIV | 60 | 0.14 | 0.060 | 70/30 | 0.90 |
| XV | 53 | 0.15 | 0.050 | 75/25 | 0.82 |
| XVI | 50 | 0.16 | 0.040 | 80/20 | 0.48 |
| XVII | 57 | 0.18 | 0.020 | 90/10 | 0.21 |
| XVIII | 53 | 0.20 | 0.00 | 100/0 | 0 |

*Percent, %, fluorine as determined by combustion analysis

Hmr (CDCl$_3$): 2.92 (s, 6H, ArCH$_3$ I) 2.94 (s, 3H, ArCH$_3$ II), 3.16 (s, 6H, NCH$_3$ II), 3.17 (s, 12H, NCH$_3$ I), 3.20 (s, 12H, NCH$_3$ III), 3.21 (s, 6H NCH$_3$ II), 6.0–9.5 (m, aromatic protons).

Further, the percentages of compounds I, II, and III present were as follows:

| Example No. | % of I | % of II | % of III |
|---|---|---|---|
| VIII | 0 | 0 | 100 |
| IX | 41.36 | 52.20 | 6.44 |
| X | 54.77 | 40.8 | 4.43 |
| XI | 71.12 | 25.8 | 3.08 |
| XII | 74.67 | 22.71 | 2.62 |

-continued

| Example No. | % of I | % of II | % of III |
|---|---|---|---|
| XIII | 79.1 | 18.7 | 2.20 |
| XIV | 83.68 | 14.5 | 1.88 |
| XV | 84.79 | 13.6 | 1.61 |
| XVI | 90.58 | 8.4 | 1.02 |
| XVII | 95.99 | 3.6 | 0.41 |
| XVIII | 100 | 0 | 0 |

EXAMPLE XIX

Photoresponsive imaging members were then prepared with each of the above mixed squaraine compositions. These members contained a supporting substrate of aluminized Mylar, a silane blocking layer, in a thickness of about 80 Angstroms, an adhesive layer, with an adhesive commercially available as duPont 49,000 in the thickness of 0.1 microns, a photoconductive layer of the mixed squaraine compositions prepared in accordance with the present invention, 0.7 microns in thickness, comprised of 30 percent by weight of the squaraine, dispersed in 70 percent by weight of a polyester resinous binder, and as a top layer, 15 microns in thickness, a charge transport layer with 35 percent by weight of the charge transporting molecule N,N'-diphenyl-N,N'-bis(3-methylphenyl)-1,1'-biphenyl-4,4'-diamine, dispersed in 65 percent by weight of a polycarbonate resinous binder.

More specifically, photoresponsive devices were prepared by providing an aluminized Mylar substrate, of a thickness of 3 mils, overcoated with a thin (80 angstroms) silane charge blocking layer and a 0.1 micron DuPont 49,000 polyester adhesive layer. A photoconductive layer, containing 30 percent by weight of a squaraine synthesized in accordance with Examples I to XVIII, was then prepared as follows:

In separate 2 ounce amber bottles, 0.30 grams of the respective squaraines, that is, those prepared in accordance with Examples I to XVIII, 0.70 grams of Vitel PE-200, a polyester available from Goodyear, 70 grams of ⅛" stainless steel shot and 19.0 grams of methylene chloride were mixed together. The above mixture was placed on a ball mill for 24 hours. The resulting slurry was then coated on the substrate with a multiple clearance film applicator, to a wet thickness of 1 mil. This layer was allowed to air dry for 5 minutes. The resulting device was dried at 80° C., for 15 minutes in a forced air oven, and the dry thickness of the squaraine layer was 0.7 microns.

A transport layer solution composed of 65 percent by weight Merlon 39 polycarbonate was mixed with 35 percent by weight N,N'-diphenyl-N,N'-bis(3-methylphenyl)-1,1'-biphenyl-4,4'-diamine. This solution was mixed to 9 percent by weight in methylene chloride. All of these components were placed in an amber bottle and dissolved. The mixture was coated to give a layer with a dry thickness of 15 microns on top of the generator layer, using a multiple clearance film applicator of 8 mils wet gap thickness. The resulting device was then air dried at room temperature for 20 minutes and then in a forced air over at 80° C. for 1 hour.

For a photoreceptor imaging device to be practical, it should exhibit good cycling performance, that is stable electrical characteristics during the repeated charge/expose/erase steps of the xerographic process. Devices incorporating the squaraines obtained from Example XII generally exhibit good short term cycling. For example, after 1,000 cycles, the change in charge acceptance was less than or equal to 100 volts, there is a minimal increase in dark decay, and the surface potential after erase (residual potential) remains low (less than or equal to 50 volts). Good contrast potential for development can therefore be maintained during repeated use of such photoreceptor devices. Similar results are observable for the other imaging members of the present invention.

The addition of small amounts of N,N-dimethyl-3-fluoroaniline to the synthesis reaction causes a substantial enhancement of the photosensitivity while the dark decay remains low. Only in Examples VIII and IX (outside of the scope of the invention), were the feed ratios (x/y) are 0/100 and 25/75 does the dark decay increase to an extent that these devices cannot be charged and thus are not useful for obtaining images.

Illustrated in FIG. 1 is a line graph detailing the effect of photosensitivity on the addition of N,N-dimethyl-3-fluoroaniline to the reaction mixture, for the squaraine mixtures of Examples II to VII, reference Table 1. This graph is a plot of the mole percent of aniline added to the reaction mixture versus a discharge number represented by $E_{1/2}$. The discharge number $E_{1/2}$, in ergs/cm$^2$, indicates the light energy required to reduce the voltage across a photoreceptor to one half its initial value. A low number, for example below 100, indicates a very sensitive photoreceptor. By way of illustration, the squaraine mixture of Example V was prepared by adding 50 mole percent of 3-fluoroaniline to the reaction mixture. When the resulting mixture was incorporated as the photogenerating composition into a device by the procedure described in Example XIX, the discharge number thereof was about 12 ergs/cm$^2$.

Figure 2:
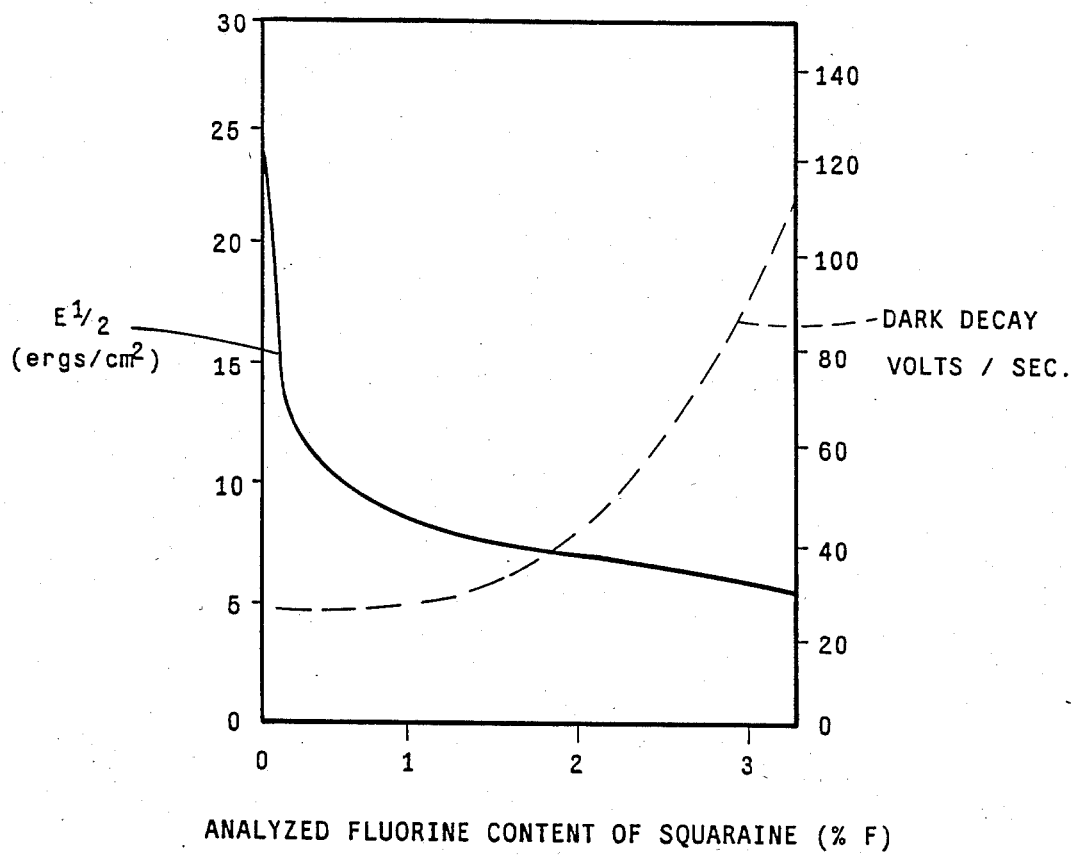

Illustrated in FIG. 2 is the effect of analyzed fluorine content on the photosensitivity, $E_{1/2}$, and the dark decay for the devices of Examples X to XVII, reference Table 2. By way of illustration, the squaraine mixture of Example XII was prepared by selecting an x/y ratio of 55/45. The analyzed fluorine content of Example XII product was 1.46 percent (Table 2). When this mixture was fabricated into a device as described in Example XIX, the discharge number thereof was about 7.5 ergs/cm$^2$, reference the dotted line in FIG. 2, with a dark decay of about 38 volts/second, reference the solid line in FIG. 2. Thus, FIG. 2 describes how the discharge numbers and dark decay values of various mixtures vary as a function of percent of components in the squaraine mixture for Examples VIII to XVIII.

Examples of azeotropic substances that can be selected are described in the copending applications referred to including, however, benzene and toluene.

Other modifications of the present invention may occur to those skilled in the art based upon a reading of the present disclosure, and these modifications are intended to be included within the scope of the present invention.

We claim:

1. An imaging member comprised of a supporting substrate; the mixed squaraine composition comprised of components I, II, and III

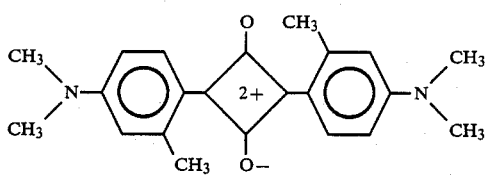

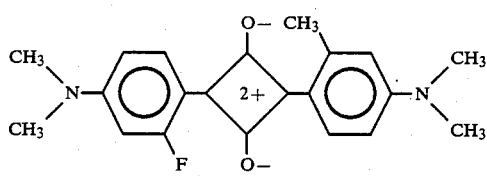

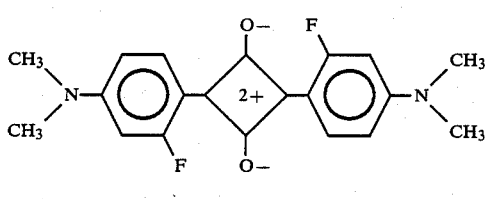

as a photogenerating pigment wherein fluorine is present in an amount of from about 0.050 to about 5 percent by weight; and in contact therewith an arylamine hole transport layer.

2. An imaging member in accordance with claim 1, wherein the components are present in the proportions I 98.50, to II 1.43, to III 0.07; to about I 41.36, to II 52.20, and III to 6.44.

3. An imaging member in accordance with claim 1 wherein the arylamine is N,N'-diphenyl-N,N'-bis(3-methylphenyl)1,1'-biphenyl-4,4'-diamine.

4. An imaging member in accordance with claim 1 wherein the hole transport layer is situated between the supporting substrate and the photogenerating pigment.

5. An imaging member in accordance with claim 1 further including therein an adhesive layer and a silane hole blocking layer.

6. An imaging member in accordance with claim 1 wherein the arylamine hole transport layer comprises molecules of the formula

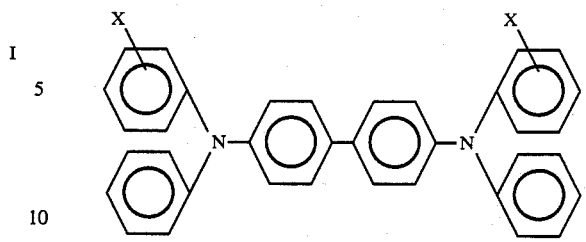

wherein X is selected from the group consisting of alkyl and halogen, and wherein the molecules are dispersed in an inactive resinous binder.

7. An improved photoresponsive imaging member comprised of a supporting substrate; an inorganic photogenerating layer; a photoconductive layer comprised of the squaraine components I, II and III,

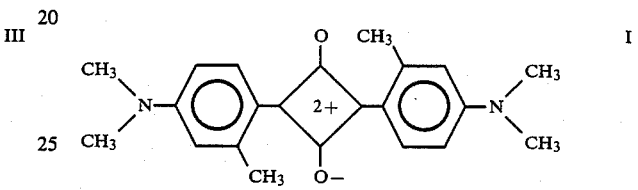

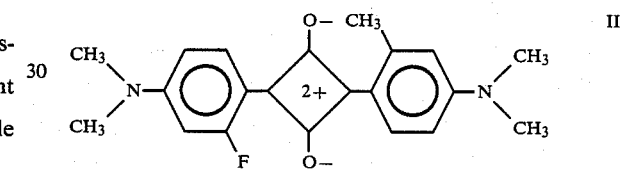

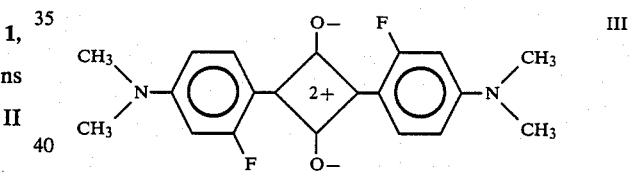

wherein fluorine is present in an amount of from about 0.050 to about 6 percent by weight; and an arylamine hole transport layer.

8. An imaging member in accordance with claim 7 further including a hole blocking layer and an optional adhesive interface layer.

9. An imaging member in accordance with claim 7 wherein the inorganic photogenerating layer contains therein substances selected from the group consisting of amorphous selenium, amorphous selenium alloys, and trigonal selenium.

10. An imaging member in accordance with claim 7 wherein the photogenerating layer contains therein vanadyl phthalocyanine.

11. An imaging member in accordance with claim 7 wherein the arylamine hole transport molecule is N,N'-diphenyl-N,N'-bis(3-methylphenyl)1,1'-biphenyl-4,4'-diamine.

* * * * *